United States Patent [19]

Yeh et al.

[11] 4,150,323
[45] Apr. 17, 1979

[54] INTENSITY CONTROL OF FLUORESCENT LAMPS

[75] Inventors: Warner S. Yeh; Hoi-Shing Lee, both of Kowloon, Hong Kong

[73] Assignee: Sonca Industries Ltd., Kowloon, Hong Kong

[21] Appl. No.: 727,381

[22] Filed: Sep. 27, 1976

[30] Foreign Application Priority Data

Oct. 1, 1975 [GB] United Kingdom ............... 40213/75

[51] Int. Cl.$^2$ ..................... H05B 37/02; H05B 39/04; H05B 41/36
[52] U.S. Cl. ........................... 315/209 R; 315/DIG. 5; 315/DIG. 7
[58] Field of Search ................. 315/DIG. 2, DIG. 7, 315/209 R, 278, 219, DIG. 5; 331/112, 146, 148; 321/43, 44

[56] References Cited

U.S. PATENT DOCUMENTS

| | | | |
|---|---|---|---|
| 3,278,861 | 10/1966 | Cunningham | 331/112 |
| 3,311,805 | 3/1967 | Kittl et al. | 321/44 |
| 3,389,298 | 6/1968 | Skirvin | 315/206 |
| 3,501,674 | 3/1970 | Moore | 315/DIG. 7 |

FOREIGN PATENT DOCUMENTS 847417 9/1960 United Kingdom ............. 315/DIG. 7

Primary Examiner—Alfred E. Smith
Assistant Examiner—Robert E. Wise
Attorney, Agent, or Firm—Wenderoth, Lind & Ponack

[57] ABSTRACT

A control circuit for a battery-operated fluorescent lamp has a transistorized inverter which acts as a blocking oscillator. Lamp intensity is controlled by applying an adjustable bias, either automatic or manual, to the base of the blocking oscillator transistor.

6 Claims, 4 Drawing Figures

INTENSITY CONTROL OF FLUORESCENT LAMPS

This invention relates to a control circuit for controlling the intensity of a fluorescent lamp. In particular, the invention is concerned with the kind of fluorescent lamp circuit which operates from a battery, typically of 12 volts or so. Such circuits include an inverter for producing an alternating current for operating the fluorescent tube at a high voltage.

Adjustment of the intensity of the illumination of fluorescent battery-operated lamp is required. In conventional lamps it is customary to provide simply an on/off switch. This means that in order to provide adequate illumination over a satisfactory period, the circuit must be designed so that when the battery is fresh the tube is run at a voltage such that the illumination is perhaps brighter than that required. As the battery runs down the level of illumination falls. It is an object of this invention to provide a means for controlling the intensity of the fluorescent tube, which means does not itself consume an appreciable amount of power. Thus, true savings in battery consumption can be achieved.

According to the invention there is provided a fluorescent lamp circuit for energizing a fluorescent tube from a low voltage direct current course. The circuit comprises a blocking oscillator inventer having an output for supplying the fluorescent tube; a transistor in the inventer, input and output circuits coupling between the output circuit and the input circuit such that electrical oscillations of the transistor are quenched automatically and repetitively because of cut-off bias potential achieved in the input circuit of the transistor; and a control device for applying an adjustable controlled steady bias to the input circuit of the transistor.

It is envisaged that the control device may comprise a further transistor in an automatic regulating circuit arranged to maintain the power output of the inverter constant. However, preferably the control device is manually adjustable and comprises a variable resistor connected in the input circuit of the transistor.

In a preferred embodiment of the invention the inverter circuit comprises a saturable transformer having a secondary winding connected to energize the fluorescent tube and two primary windings in the emitter and base circuits of the transistor, respectively. A resistance-capacitance circuit is connected in series with the winding in the base circuit and the adjustable resistor is connected between the circuit between the direct current source and the junction between the resistor and the capacitor.

The invention will further be described with reference to the accompanying drawings, of which:

Figure 1:
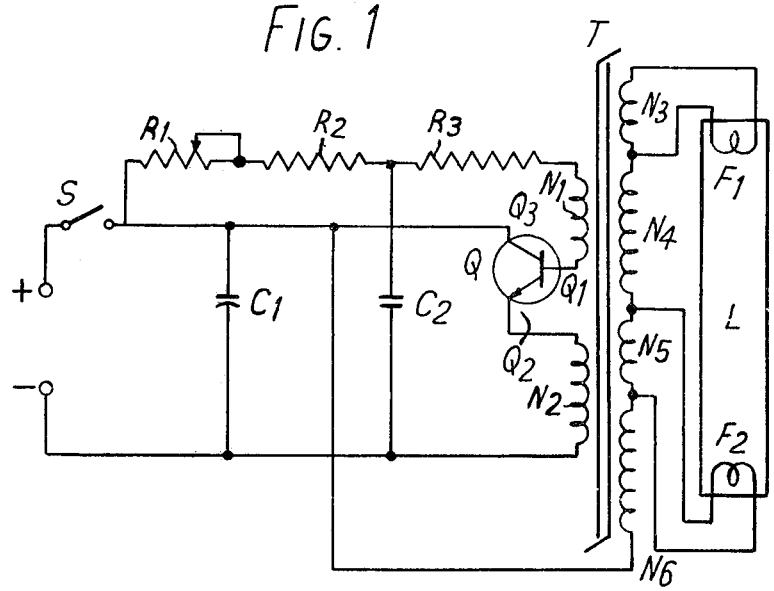
FIG. 1 is a circuit diagram of one embodiment of the invention.

Referring to FIG. 1 there is shown a circuit having supply terminals marked + and − for the supply of 12 volt battery potential. An inverter circuit converts the battery voltage to a high voltage alternating current for application to the filaments F1 and F2 of a fluorescent tube L. The inverter circuit comprises a saturable transformer T having output windings N3 and N5 connected across the filaments and an output winding N4 connected between the windings N3 and N5. An additional winding N6 is provided on the output side of the transformer. This secondary winding N6 raises the potential differences between the lamp and ground. This structure is a conventional means to facilitate starting of the lamp.

A transistor Q acts as a blocking oscillator transistor and derives input from the battery B across which is connected a capacitor C1. The transistor has a winding N2 which is connected to the emitter Q2 and which constitutes a primary winding of the transformer T. The emitter collector circuit of the transistor is connected across the supply terminals of the battery, the collector being shown at Q3.

A feedback winding N1 is connected to the base Q1 of the transistor and also to a series resistance-capacitance circuit comprising a resistor R3 and a capacitor C2.

The transistor is the active element in the blocking oscillator. When the circuit is switched on by a switch S the transistor will conduct and feedback takes place via the transformer from winding N2 to winding N1.

These transformer winding connections are made so that a regenerative action drives the transistor to saturation. As soon as the transistor saturates, the collector current of the transistor ceases to change. The voltages across N1 and N2 cannot now be maintained but due to the presence of the magnetizing inductance of the transformer they will decay exponentially. When the voltages have decayed sufficiently for the transistor to come out of saturation the collector current begins to decrease. A changing current again induces voltages across N2 and N1 but since now the change is in the opposite direction, the voltage applied to the base will be of the opposite polarity, causing the transistor to cut off. After the cut off, the capacitor C2 is left with a negative charge at the base of the transistor Q and the oscillation ceases until the charge on capacitor C2 discharges when the cycle is repeated. The repetition rate or frequency is dependent on the time constant of the resistance-capacitance circuit including C2.

In order to control the intensity of the illumination of tube L there is provided a variable resistor R1, connected in series with a resistor R2 to the junction between resistor R3 and capacitor C2. The effect of resistor R1 is to apply an adjustable bias potential to the capacitor C2, and in general to the input circuit of the transistor. Thus, it will be appreciated that the blocking oscillator frequency can be adjusted by means of this device and this affects the power transmitted to the tube L. In this way, adequate control of the illumination of tube L can be achieved—for example over a ratio of illumination of 1:4. At the same time, there is negligible power loss in the control circuit comprising resistors R1 and R2. Thus, control of illumination can be achieved to suit individual circumstances and the power consumed from the battery can be minimized. Battery life may thus be prolonged.

Figure 2:
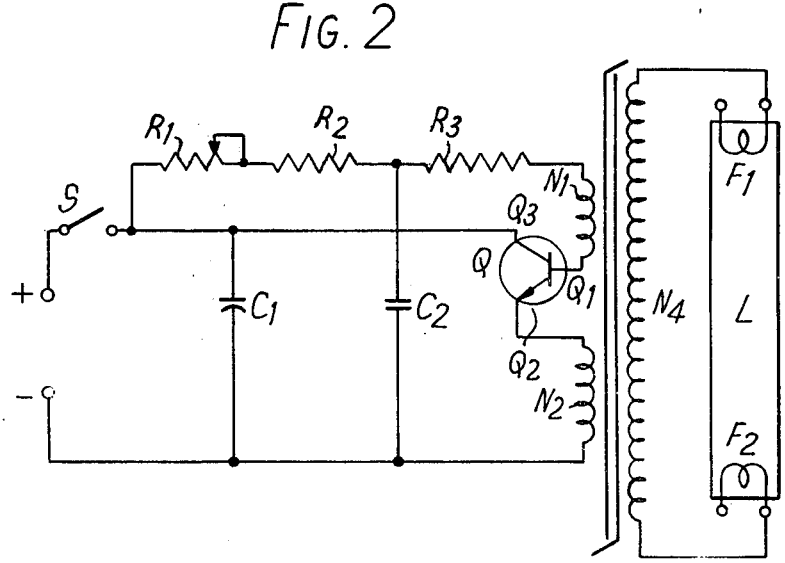
FIG. 2 is a circuit diagram of another embodiment of the invention.

The circuit of FIG. 2 differs from that of FIG. 1 only in the omission of some of the transformer windings, with consequent simplification. In the FIG. 2 embodiment there are no separate windings N3 and N5 for heating the tube filaments and winding N6, and its connection to the collector of the transistor is also omitted. Nevertheless, the circuit of FIG. 2 operates in the same manner as that of FIG. 1 as far as the generation of blocking oscillations and intensity control are concerned.

Typical component values for the components of the circuit of FIG. 1 are as follows:

| | | |
|---|---|---|
| | C1 | 100 mfd |
| | C2 | 0.1 mfd |
| | R3 | 22 ohm |
| | R2 | 500–1500 ohm |
| | R1 | 0–5000 ohm variable Rheostat |
| | N1 | 27 turns |
| | N2 | 21 turns |
| | N3 | 6 turns |
| | N4 | 78 turns |
| | N5 | 6 turns |
| | N6 | 80 turns |

In FIG. 2 the circuit values are the same as those given above except that winding N4 has 150 turns and, of course, windings N3, N5 and N6 are omitted.

Figure 3:
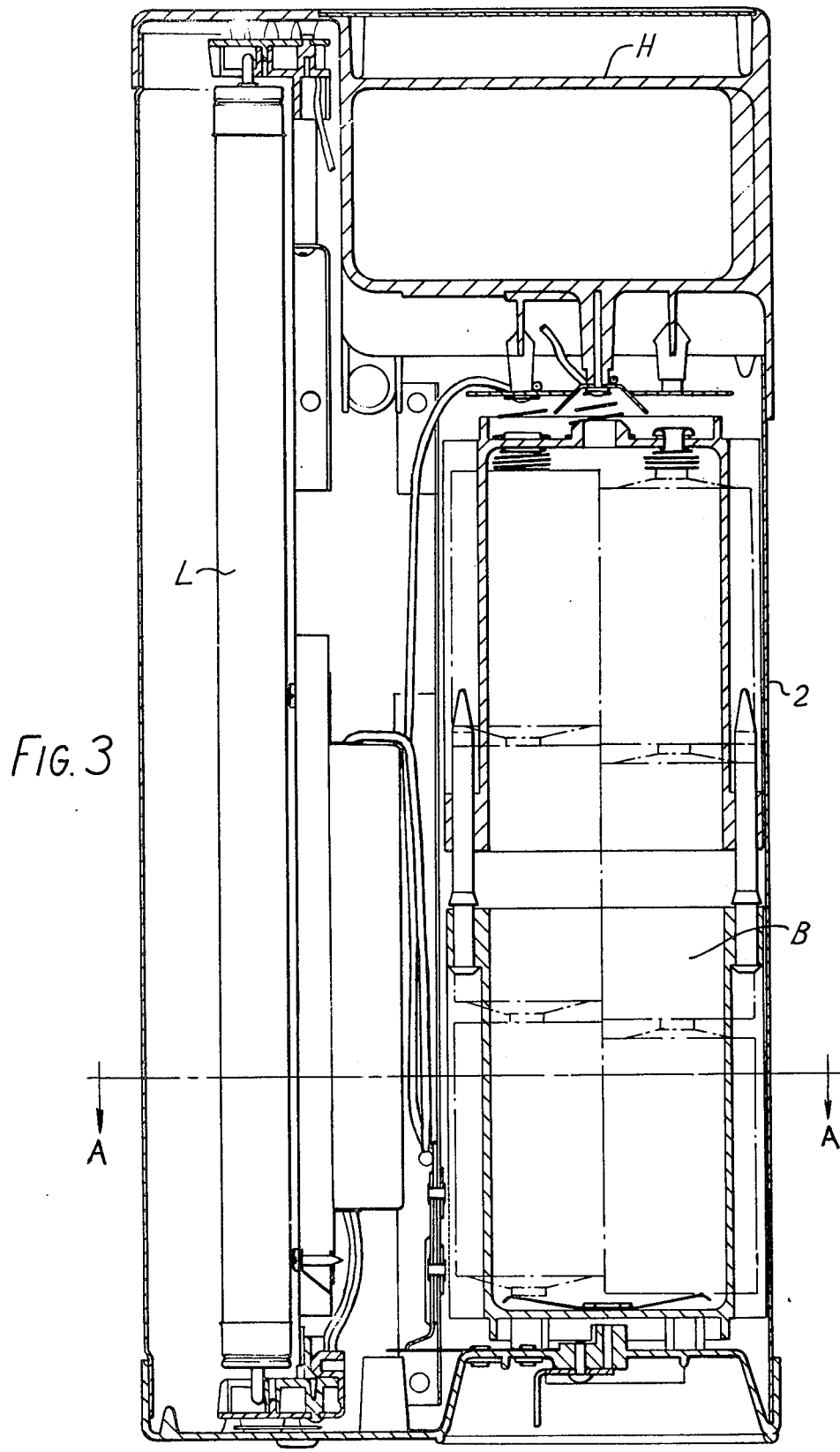
FIG. 3 is a cross-sectional elevation of a fluorescent lamp embodying a circuit according to the invention.
Figure 4:
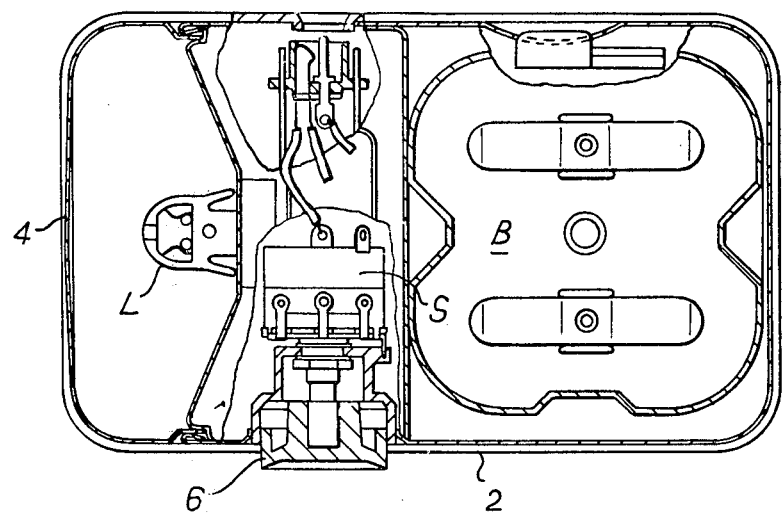
FIG. 4 is a cross-sectional plan view taken at A—A of FIG. 3.

Referring now to FIGS. 3 and 4 there is shown a lamp including a circuit which embodies the invention. The circuit is as shown in FIG. 1 and is mounted in a plastic circuit housing 1 within the lamp body 2 which also houses the fluorescent tube L and the battery B of six dry cells. The tube is situated behind a translucent screen 4 and the body 2 is shaped to provide a handle H.

The on/off switch S of FIG. 1 is incorporated in the brightness-control variable resistor R1. Thus, switching and brightness control are controlled by manipulation of the control knob 6 of the variable resistor R1.

We claim:

1. A fluorescent lamp energizing circuit for energizing a fluorescent lamp from a low voltage direct current source comprising:
   a blocking oscillator inverter for receiving input power from the low voltage current source and for generating an output for energizing the fluorescent lamp having a transistor, an input circuit coupled to said transistor, an output circuit coupled to said transistor, a passive feedback means comprising a saturable core associated with said input and output circuits for coupling said input and output circuits to cause electrical oscillations by said transistor that are automatically and repetitively quenched by cut off bias potential in said input circuit, and an adjustable current source for supplying an adjustable steady bias to said input circuit for adjusting the illumination produced by the fluorescent lamp.

2. A fluorescent lamp circuit as claimed in claim 1 wherein said adjustable current source is a manually adjustable variable resistor connected to said input circuit of said transistor.

3. A fluorescent lamp energizing circuit as claimed in claim 1 wherein said blocking oscillator inverter further include:
   at least one secondary winding for coupling power to the fluorescent lamp; first and second primary windings; and said transistor has an emitter electrode connected to said first primary winding and a base electrode connected to said second primary winding; wherein said passive coupling means comprising a saturable core has said at least one secondary winding and said first and second primary windings wound thereon.

4. A fluorescent lamp energizing circuit as claimed in claim 3 wherein:
   said input circuit of said transistor is coupled to said first primary winding and comprises the connection of a resistance, a capacitance and one terminal of the low voltage direct current source; and said adjustable current source is connected between the low voltage direct current source and the junction between said resistance and said capacitance.

5. A fluorescent lamp circuit as claimed in claim 3 wherein said secondary winding of said saturable core is tapped to provide individual windings for connection across each of two heating filaments of the fluorescent lamp.

6. A fluorescent lamp circuit as claimed in claim 3 wherein said secondary winding of said saturable core is a single un-tapped winding and each end of said winding is connected to a respective heating element of the fluorescent lamp.

* * * * *